US012769258B2

(12) United States Patent
Jiang et al.

(10) Patent No.: US 12,769,258 B2
(45) Date of Patent: Oct. 20, 2026

(54) DISPLAY DEVICES AND WATCHES INCLUDING THE SAME

(71) Applicant: Wuhan China Star Optoelectronics Semiconductor Display Technology Co., Ltd., Wuhan (CN)

(72) Inventors: Guobao Jiang, Wuhan (CN); Xinpeng Shan, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 764 days.

(21) Appl. No.: 18/253,784

(22) PCT Filed: Apr. 18, 2023

(86) PCT No.: PCT/CN2023/088995

§ 371 (c)(1),
(2) Date: May 21, 2023

(87) PCT Pub. No.: WO2024/001440

PCT Pub. Date: Jan. 4, 2024

(65) Prior Publication Data

US 2024/0369976 A1 Nov. 7, 2024

(30) Foreign Application Priority Data

Jul. 1, 2022 (CN) ......................... 202210774963.1

(51) Int. Cl.
*G04G 17/04* (2006.01)

(52) U.S. Cl.
CPC .................................. *G04G 17/045* (2013.01)

(58) Field of Classification Search
CPC ........ G04G 17/045; G04G 9/00; G09F 9/301; F16H 19/043; F16H 57/023; F16H 57/038
See application file for complete search history.

(56) References Cited

U.S. PATENT DOCUMENTS

2021/0375165 A1* 12/2021 Feng ....................... G09F 9/301
2023/0113925 A1* 4/2023 Kang ...................... G06F 21/32
361/807

FOREIGN PATENT DOCUMENTS

CN 107820399 A 3/2018
CN 208227112 U 12/2018
(Continued)

OTHER PUBLICATIONS

International Search Report in International application No. PCT/CN2023/088995,mailed on Jul. 20, 2023.
(Continued)

*Primary Examiner* — Edwin A. Leon
*Assistant Examiner* — Kevin Andrew Johnston
(74) *Attorney, Agent, or Firm* — Menachem Nathan; Nathan & Associates

(57) ABSTRACT

The present disclosure discloses a display device and a watch including the same. A first rack of the display device is fixedly disposed on a second middle frame of the display device, a first gear is disposed inside a first fame body and engaged with the first rack, so that the second middle frame and a first middle frame are disposed slidably; a flexible panel is disposed on a first support body of the first middle frame and a second support body of the second middle frame, and a rolling up element is configured to roll up the flexible panel.

20 Claims, 7 Drawing Sheets

(56) References Cited

FOREIGN PATENT DOCUMENTS

| | | | | | |
|---|---|---|---|---|---|
| CN | 111309103 | A | | 6/2020 | |
| CN | 111510536 | A | | 8/2020 | |
| CN | 112530286 | A | | 3/2021 | |
| CN | 113242345 | A | * | 8/2021 | .......... H04M 1/0268 |
| CN | 113345332 | A | | 9/2021 | |
| CN | 113496656 | A | * | 10/2021 | ............. G09F 9/301 |
| CN | 114244930 | A | * | 3/2022 | .......... H04M 1/0268 |
| CN | 115083283 | A | | 9/2022 | |
| WO | 2021246661 | A1 | | 12/2021 | |

OTHER PUBLICATIONS

Written Opinion of the International Search Authority in International application No. PCT/CN2023/088995,mailed on Jul. 20, 2023.
Chinese Office Action issued in corresponding Chinese Patent Application No. 202210774963.1 dated Apr. 27, 2023, pp. 1-9.

* cited by examiner

DISPLAY DEVICES AND WATCHES INCLUDING THE SAME

CROSS REFERENCE TO RELATED APPLICATIONS

This application claims priority to and the benefit of Chinese Patent Application No. 202210774963.1, filed on Jul. 1, 2022, the disclosure of which is incorporated herein by reference in its entirety.

TECHNICAL FIELD

The present disclosure relates to the technical field of display, in particular to display devices and watches including the same.

BACKGROUND

Compared with traditional panels, flexible panels have significant advantages, such as providing users with new usage effects, being smaller in sizes and lower in power consumption, and having flexibility to reduce a risk of breakage of the panels. With development of flexible display, various forms of display devices with display panels have emerged, such as foldable panels with folding hinges, retractable panels with a reel design, and sliding retractable panels with a matching design of pull-out and reel.

In the research and practice of existing technologies, the inventors of the present disclosure found that using a pull-out method to unfold and fold the flexible panels makes it difficult to precisely control sizes of the flexible panels.

SUMMARY

Technical Problems

Embodiments of the present disclosure provides a display device and a watch that can precisely control sizes of flexible panels.

Technical Solutions

An embodiment of the present disclosure provides a display device, including:

- a first middle frame, wherein the first middle frame includes a first frame body and a first support body disposed on the first frame body;
- a second middle frame, wherein the second middle frame and the first middle frame are disposed slidably, and the second middle frame includes a second frame body and a second support body disposed on the second frame body;
- a first rack, wherein the first rack is fixedly disposed on the second middle frame;
- a first gear, wherein the first gear is disposed inside the first frame body and engaged with the first rack;
- a driving assembly, wherein the driving assembly is disposed inside the first middle frame and configured to drive the first gear to rotate;
- a flexible panel, wherein the flexible panel is disposed on the first support body and the second support body; and
- a rolling up element, wherein the rolling up element is configured to roll up the flexible panel.

Optionally, in some embodiments of the present disclosure, the driving assembly includes a rotation axis, the rotation axis is disposed inside the first middle frame, rotatably connected to a side wall of the first frame body, and configured to drive the first gear to rotate; and the first gear is sleeved on a peripheral side of the rotation axis.

Optionally, in some embodiments of the present disclosure, the display device further includes a third middle frame and a second rack; the third middle frame includes a third frame body and a third support body disposed on the third frame body; one of the second rack and the first rack is located above the first gear, and another one of the second rack and the first rack is located below the first gear; and

- the third middle frame and the first middle frame are disposed slidably; the second rack is fixedly disposed on the third middle frame and engaged with the first gear; the flexible panel is further disposed on the third support body.

Optionally, in some embodiments of the present disclosure, the driving assembly further includes a second gear, a third gear, and a substrate module; the substrate module is configured to be fixed on an external member; the second gear is sleeved on a peripheral side of the rotation axis and disposed on a side of the first gear and the third gear is disposed inside the first middle frame;

- the first middle frame is disposed on the substrate module including a substrate and a latch disposed on the substrate; the latch passes through a bottom of the first frame body and extends into the first frame body, and the third gear is fixedly connected to the latch; and the first middle frame is rotatably connected to the latch; and
- the second gear and the third gear are engaged with each other and are both bevel gears.

Optionally, in some embodiments of the present disclosure, the latch includes a rotating part and a clamping part disposed on the rotating part; a bottom of the first middle frame is provided with a through-hole, and the third gear is provided with a clamping hole; and

- the rotating part is disposed in the through-hole and rotationally connected to the bottom of the first middle frame, and the clamping part is clamped in the clamping hole.

Optionally, in some embodiments of the present disclosure, the first frame body is inserted into the second frame body, and the third frame body is inserted into the first frame body; and

- a bottom of the second frame body is provided with a first opening channel configured to dodge the latch; a bottom of the third frame body is provided with a second opening channel configured to dodge the third gear; a side wall of the third frame body is equipped with a third opening channel configured to dodge the rotation axis.

Optionally, in some embodiments of the present disclosure, the first support body is connected to opposite sides of the first frame body; the first support body includes a support part and is provided with a first chute and a second chute, and the support part is disposed between the first chute and the second chute; and

- the second support body is slidably disposed inside the first chute, and the third support body is slidably disposed inside the second chute.

Optionally, in some embodiments of the present disclosure, the support part, the second support body, and the third support body are alternately disposed in sequence.

Optionally, in some embodiments of the present disclosure, the first chute includes an upper slot and a lower slot interconnected to each other, and a width of the lower slot is greater than a width of the upper slot;

the second support body includes a lower support part and an upper support part disposed on the lower support part, and a width of the upper support part is less than a width of the lower support part; and the upper support part is disposed in the upper slot, and the lower support part is disposed in the lower slot.

Optionally, in some embodiments of the present disclosure, the rolling up element includes a first rolling up element and a second rolling up element, the first rolling up element is rotationally disposed on a side of the second frame body away from the third middle frame, and the second rolling up element is rotationally disposed on a side of the third frame body away from the second middle frame;

an end of the flexible panel is connected to a peripheral side surface of the first rolling up element, and another end of the flexible panel is connected to a peripheral side surface of the second rolling up element;

an end part of the first rolling up element is provided with a first accommodating hole, and an end part of the second rolling up element is provided with a second accommodating hole; and the display device further includes a first coil spring and a second coil spring; the first coil spring is disposed in the first accommodating hole, an end of the first coil spring is fixedly connected to the first rolling up element, and another end of the first coil spring is fixedly connected to the second frame body; the second coil spring is disposed in the second accommodating hole, an end of the second coil spring is fixedly connected to the second rolling up element, and another end of the second coil spring is fixedly connected to the third frame body.

Optionally, in some embodiments of the present disclosure, another end part of the first rolling up element is provided with a third accommodating hole, and another end part of the second rolling up element is provided with a fourth accommodating hole;

the display device further includes a first damper and a second damper; the first damper is disposed in the third accommodating hole, an end of the first damper is fixedly connected to the first rolling up element, and another end of the first damper is fixedly connected to the second frame body; the second damper is disposed in the fourth accommodating hole, an end of the second damper is fixedly connected to the second rolling up element, and another end of the second damper is fixedly connected to the third frame body.

Correspondingly, an embodiment of the present disclosure also provides a watch including a watchband and a display device as described in any of the above-mentioned embodiments, and the watchband is connected to a side of a substrate;

wherein the display device includes:

a first middle frame, wherein the first middle frame includes a first frame body and a first support body disposed on the first frame body;

a second middle frame, wherein the second middle frame and the first middle frame are disposed slidably, and the second middle frame includes a second frame body and a second support body disposed on the second frame body;

a first rack, wherein the first rack is fixedly disposed on the second middle frame;

a first gear, wherein the first gear is disposed inside the first frame body and engaged with the first rack;

a driving assembly, wherein the driving assembly is disposed inside the first middle frame and configured to drive the first gear to rotate;

a flexible panel, wherein the flexible panel is disposed on the first support body and the second support body; and a rolling up element, wherein the rolling up element is configured to roll up the flexible panel;

wherein the driving assembly includes a rotation axis and a substrate module, the first middle frame is disposed on the substrate module, and the watchband is connected to a side of the substrate module; the rotation axis is disposed inside the first middle frame and rotatably connected to a side wall of the first frame body, and configured to drive the first gear to rotate, and the first gear is sleeved on a peripheral side of the rotation axis;

the display device further includes a third middle frame and a second rack; the third middle frame includes a third frame body and a third support body disposed on the third frame body; one of the second rack and the first rack is located above the first gear, and another one of the second rack and the first rack is located below the first gear; and the third middle frame and the first middle frame are disposed slidably; the second rack is fixedly disposed on the third middle frame and engaged with the first gear; the flexible panel is further disposed on the third support body.

Optionally, in some embodiments of the present disclosure, the driving assembly further includes a second gear and a third gear; the substrate module is configured to be fixed on an external member; the second gear is sleeved on a peripheral side of the rotation axis and disposed on a side of the first gear; and the third gear is disposed inside the first middle frame.

the substrate module includes a substrate and a latch disposed on the substrate; the latch passes through a bottom of the first frame body and extends into the first frame body, and the third gear is fixedly connected to the latch; and the first middle frame is rotatably connected to the latch; and the second gear and the third gear are engaged with each other and are both bevel gears.

Optionally, in some embodiments of the present disclosure, the driving assembly includes a second gear and a third gear; the substrate module is configured to be fixed on an external member, the second gear is sleeved on a peripheral side of the rotation axis and disposed on a side of the first gear; the third gear is disposed inside the first middle frame;

the first middle frame is disposed on the substrate module including a base and a latch disposed on the base; the latch passes through a bottom of the first frame body and extends into the first frame body, and the third gear is fixedly connected to the latch; the first middle frame is rotatably connected to the latch; and the second gear and the third gear are engaged with each other and are both bevel gears.

Optionally, in some embodiments of the present disclosure, the latch includes a rotating part and a clamping part disposed on the rotating part; a bottom of the first middle frame is provided with a through-hole, and the third gear is provided with a clamping hole; and the rotating part is disposed in the through-hole and rotationally connected to the bottom of the first middle frame, and the clamping part is clamped in the clamping hole.

Optionally, in some embodiments of the present disclosure, the latch includes a rotating part and a clamping part disposed on the rotating part; a bottom of the first middle frame is provided with a through-hole, and the third gear is provided with a clamping hole; and the rotating part is disposed in the through-hole and rotationally connected to the bottom of the first middle frame, and the clamping part is clamped in the clamping hole.

Optionally, in some embodiments of the present disclosure, the first frame body is inserted into the second frame body, and the third frame body is inserted into the first frame body; and a bottom of the second frame body is provided with a first opening channel configured to dodge the latch; a bottom of the third frame body is provided with a second opening channel configured to dodge the third gear; a side wall of the third frame body is equipped with a third opening channel configured to dodge the rotation axis.

Optionally, in some embodiments of the present disclosure, the first support body is connected to opposite sides of the first frame body; the first support body includes a support part and is provided with a first chute and a second chute, and the support part is disposed between the first chute and the second chute; and the second support body is slidably disposed inside the first chute, and the third support body is slidably disposed inside the second chute.

Beneficial Effects

In a display device provided by embodiments of the present disclosure, a first rack is fixedly disposed on a second middle frame, a first gear is disposed inside a first fame body and engaged with the first rack, so that the second middle frame and a first middle frame can be disposed slidably; a flexible panel is disposed on a first support body of the first middle frame and a second support body of the second middle frame, and a rolling up element is configured to roll up the flexible panel.

When the display device is in a folded state, the second middle frame and the first middle frame are close to each other, and a part of the flexible panel is rolled up by the rolling up element; when the display device is in an unfolded state, the second middle frame and the first middle frame are away from each other, and the flexible panel is released from the rolling up element.

By adopting an engagement of the first rack and the first gear, the first middle frame and the second middle frame can be driven to slide, which can control sliding of the first middle frame and the second middle frame precisely.

BRIEF DESCRIPTION OF THE DRAWINGS

In order to explain technical solutions in the embodiments of the present disclosure more clearly, the following will briefly introduce the drawings needed to be used in description of the embodiments. Obviously, the drawings in the following description are only some embodiments of the present disclosure. For those skilled in the art, other drawings can be obtained from these drawings without paying creative effort.

DETAILED DESCRIPTION

Figure 1:
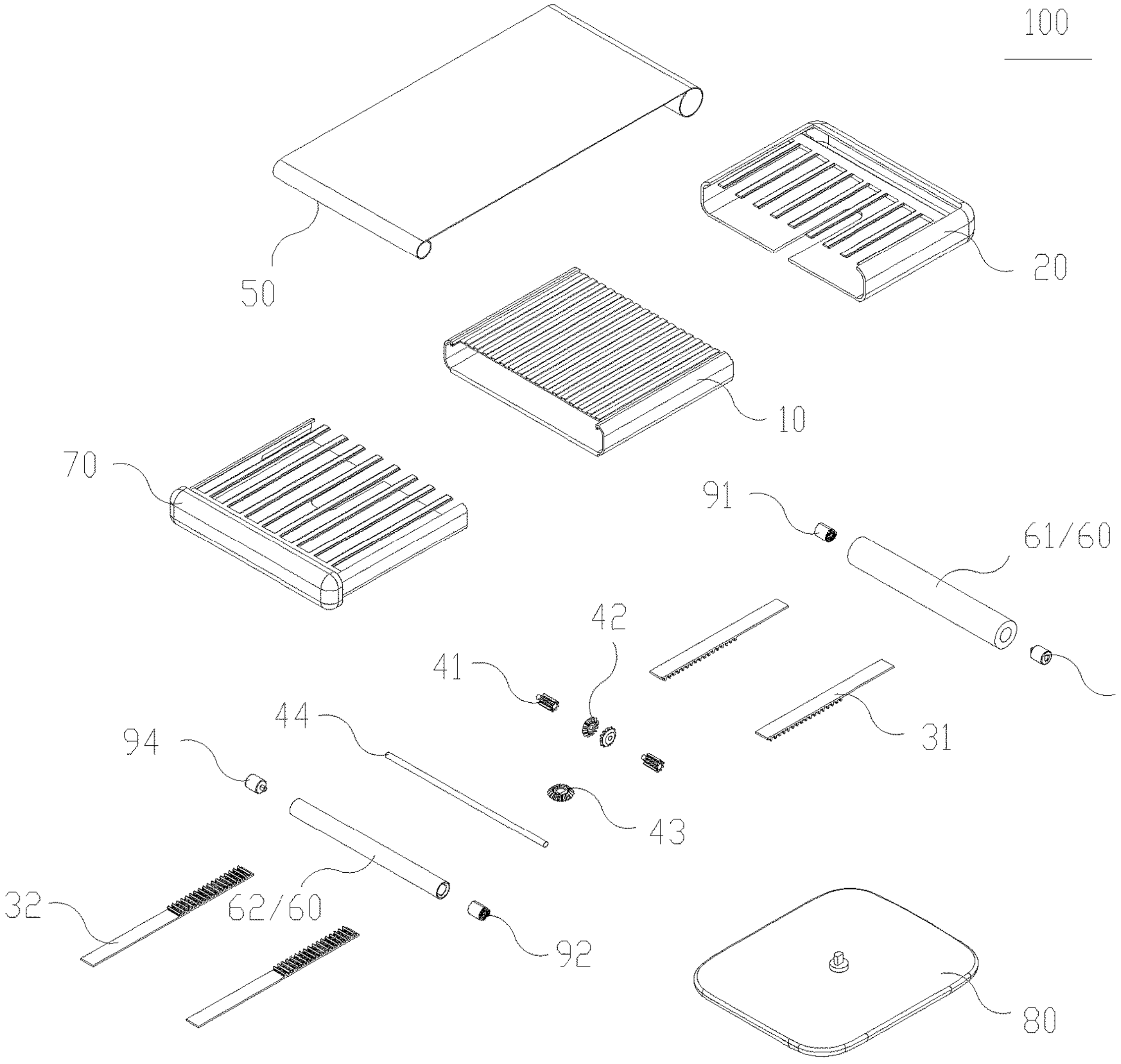
FIG. 1 is an exploded diagram of a display device provided by an embodiment of the present disclosure.
Figure 2:
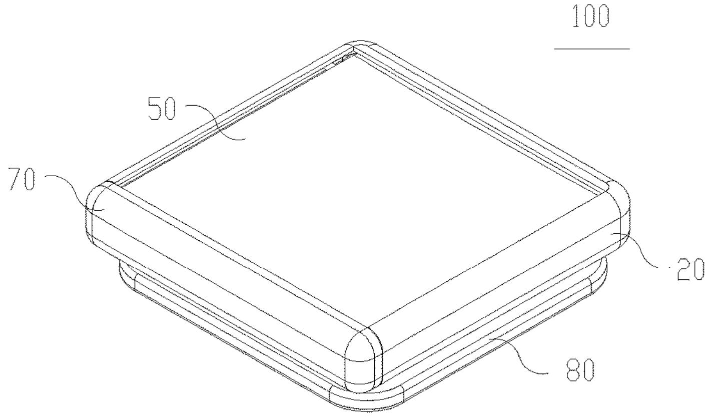
FIG. 2 is a schematic structural diagram of the display device in a folded state provided by the embodiment of the present disclosure.
Figure 3:
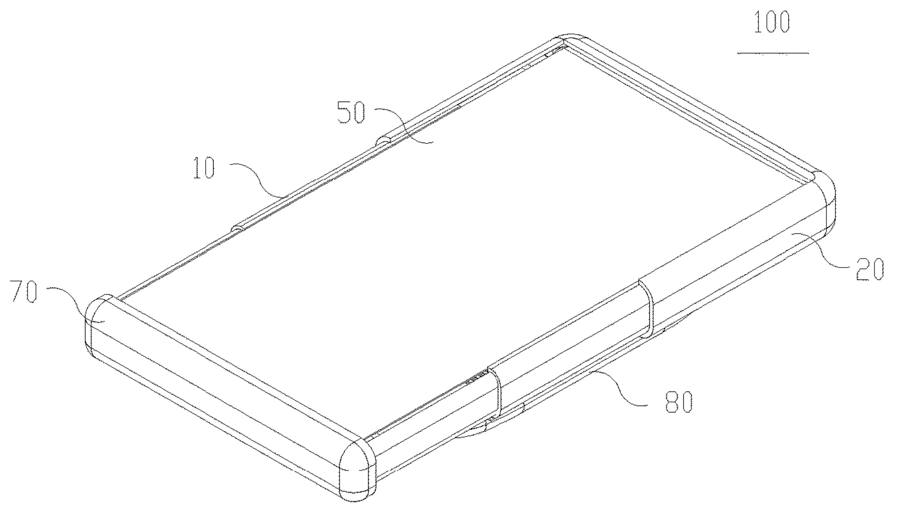
FIG. 3 is a schematic structural diagram of the display device in an unfolded state provided by the embodiment of the present disclosure.
Figure 4:
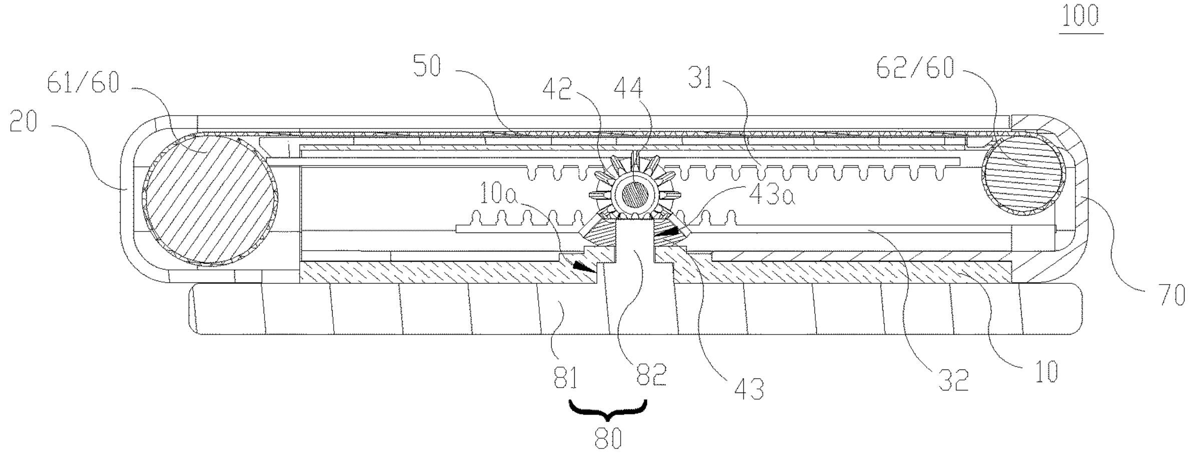
FIG. 4 is a schematic cross-sectional diagram of FIG. 2.

In combination with drawings in the embodiments of the present disclosure, technical solutions in the embodiments of the present disclosure will be described clearly and completely. Obviously, the described embodiments are only part of the embodiments of the present disclosure, not all of them. Based on the embodiments of the present disclosure, all other embodiments obtained by those skilled in the art without creative effort belong to a scope of the present disclosure. In addition, it should be understood that specific embodiments described herein are only used to explain and interpret the present disclosure and are not used to limit the present disclosure. In the present disclosure, location terms used, such as "up" and "down", generally refer to up and down in actual using or working state of devices, in particular drawing directions in the drawings, unless otherwise described; terms "inside" and "outside" refer to outlines of the devices.

Embodiments of the present disclosure provides a display device and a watch including the display device, which will be described in detail below. It should be noted that a description order of the following embodiments does not serve as a limitation to a preferred order of the embodiments.

Please refer to FIG. 1 to FIG. 5. An embodiment of the present disclosure provides a display device 100 including a first middle frame 10, a second middle frame 20, a first rack 31, a first gear 41, a driving assembly (not shown in the figures), a flexible panel 50, and a rolling up element 60.

The first middle frame 10 includes a first frame body 11 and a first support body 12 disposed on the first frame body 11. The second middle frame 20 and the first middle frame 10 are disposed slidably. The second middle frame 20 includes a second frame body 21 and a second support body 22 disposed on the second frame body 21.

The first rack 31 is fixedly disposed on the second middle frame 20. The first gear 41 is disposed inside the first frame body 11 and engaged with the first rack 31.

The driving assembly is disposed inside the first middle frame 10. The driving assembly is configured to drive the first gear 41 to rotate.

The flexible panel 50 is disposed on the first support body 12 and the second support body 22. The rolling up element 60 is configured to roll up the flexible panel 50.

In the display device 100 provided by the embodiment of the present disclosure, the first rack 31 is fixedly disposed on the second middle frame 20, the first gear 41 is disposed inside the first fame body 11 and engaged with the first rack 31, so that the second middle frame 20 and the first middle frame 10 can be disposed slidably; the flexible panel 50 is disposed on the first support body 12 of the first middle frame 10 and the second support body 22 of the second middle frame 20, and the rolling up element 60 is configured to roll up the flexible panel 50.

When the display device 100 is in a folded state, the second middle frame 20 and the first middle frame 10 are close to each other, and a part of the flexible panel 50 is rolled up by the rolling up element 60; when the display device 100 is in an unfolded state, the second middle frame 20 and the first middle frame 10 are away from each other, and the flexible panel 50 is released from the rolling up element 60.

By adopting an engagement of the first rack 31 and the first gear 41, the first middle frame 10 and the second middle frame 20 can be driven to slide, so as to control sliding of the first middle frame 10 and the second middle 20 precisely, thereby controlling folding states of the flexible panel 50 precisely.

Optionally, the display device 100 also includes a third middle frame 70 and a second rack 32. The third middle frame 70 includes a third frame body 71 and a third support body 72 disposed on the third frame body 71. One of the second rack 32 and the first rack 31 is located above the first gear 41, and the other of the second rack 32 and the first rack 31 is located below the first gear 41.

The third middle frame 70 and the first middle frame 10 are disposed slidably. The second rack 32 is fixedly disposed on the third middle frame 70. The first gear 41 engaged with the second rack 32. The flexible panel 50 is also disposed on the third support body 72.

It should be noted that due to engaging of the first gear 41 with the first rack 31 and the second rack 32 disposed opposite to each other, rotation of the first gear 41 can drive the first rack 31 and the second rack 32 to move in opposite directions.

By adopting a sliding design of the third middle frame 70 and the first middle frame 10, the flexible panel 50 in the embodiment can stretch towards two sides simultaneously when in the unfolded state, which can improve an unfolding rate of the flexible panel 50.

When the display device 100 is in the folded state, the first middle frame 10, the second middle frame 20, and the third middle frame 70 overlap, so that an area of the flexible panel 50 is approximately equal to an area of the first middle frame 10. When the display device 100 is in the unfolded state, the second middle frame 20 and the third middle frame 70 are respectively away from the first middle frame 10, and overlap with side edge areas of the first middle frame 10, respectively, so that the area of the flexible panel 50 is approximately equal to a sum of the area of the first middle frame 10, an area of the second middle frame 20, and an area of the third middle frame 70. The above-mentioned design allows for a larger area of expansion of the flexible panel 50 in the folded state with a smaller space in the folded state.

Optionally, both a quantity of the first rack 31 and a quantity of the second rack 32 are two. A quantity of the first gear 41 is also two. One first gear 41 simultaneously drives the corresponding first rack 31 and the corresponding second rack 32 to form a linkage assembly. One linkage assembly is disposed on a side of the first frame body 11, and the other linkage assembly is disposed on the other side of the first frame body 11. The above-mentioned design respectively improves stability of sliding of the first middle frame 10, sliding of the second middle frame 20, and sliding of the third middle frame 70.

Figure 6:
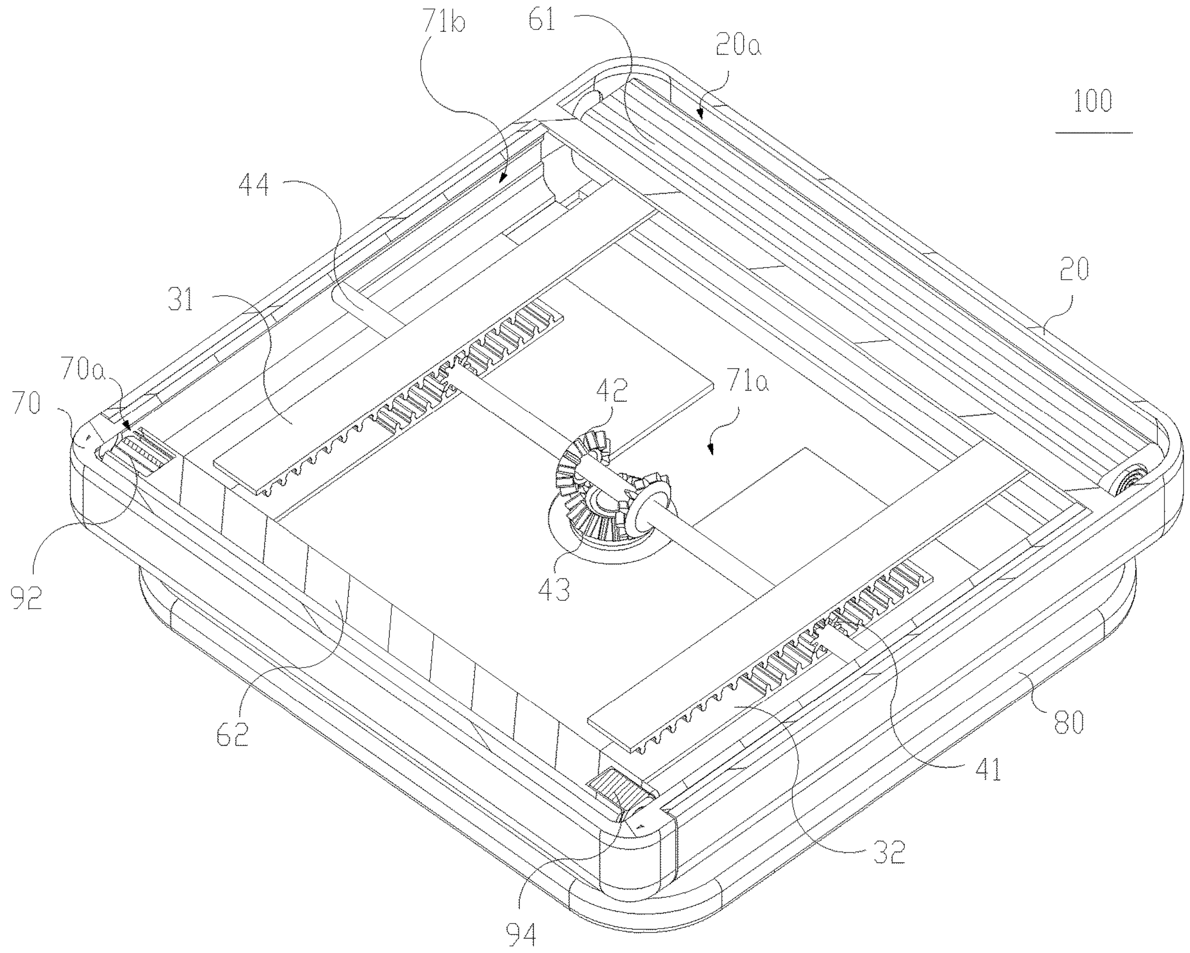
FIG. 6 is a first schematic partial structural diagram of the display device provided by the embodiment of the present disclosure.

Optionally, the driving assembly includes a rotation axis 44. The rotation axis 44 is disposed inside the first middle frame 10 and rotatably connected to a side wall of the first frame body 11, and configured to drive the first gear 41 to rotate. The first gear 41 is sleeved on a peripheral side of the rotation axis 44.

please refer to FIG. 6, optionally, the driving assembly also includes a second gear 42, a third gear 43, and a substrate module 80. The substrate module 80 is configured to be fixed on an external member. The second gear 42 is sleeved on a peripheral side of the rotation axis 44 and disposed on a side of the first gear 41. The third gear 43 is disposed inside the first middle frame 10 and engaged with the second gear 42.

The first middle frame 10 is disposed on the substrate module 80. The substrate module 80 includes a substrate 81 and a latch 82 disposed on the substrate 81. The latch 82 passes through a bottom of the first frame body 11 and extends into the first frame body 11. The third gear 43 is fixedly connected to the latch 82. The first middle frame 10 is rotationally connected to the latch 82.

The second gear 42 and the third gear 43 are both bevel gears.

The substrate module 80 of the embodiment can be fixed on the external member that may be a member such as a watchband, a wall, a bracket, a backpack, or a computer that can fix the substrate module 80. Due to a fact that the external member restricts rotation of the substrate module 80, the first middle frame 10 is rotationally connected to the substrate module 80, and the latch 82 is fixedly connected to the third gear 43, therefore, the third gear 43 can be fixed without rotating, so that the substrate module 80 and the first middle frame 10 can rotate relative to each other. Further, due to a fact that the rotation axis 44 is rotatably fixed on the first middle frame 10, and the second gear 42 is sleeved on the rotation axis 44, by rotating the first middle frame 10, the second gear 42 can rotate with rotation of the first middle frame 10, that is, the second gear 42 rotates around a circumferential direction of the third gear 43; and due to a relative rotation of the second gear 42 and the third gear 43 in the circumferential direction, the second gear 42 is prompted to rotate in a vertical direction, which in turn drives the rotation axis 44 and the first gear 41 disposed on the rotation axis 44; subsequently, the first gear 41 drives the first rack 31 and the second rack 32 to move towards directions away from each other, enabling the second middle frame 20 and the third middle frame 70 to move towards directions away from each other, so as to unfold the flexible panel 50. If the first middle frame 10 is rotated in a reverse direction, the second middle frame 20 and the third middle frame 70 are close to each other, and the display device 100 switches from the unfolded state to the folded state, causing the flexible panel 50 to be rolled up. For example, when the present solution is applied to a watch, and the substrate module 80 is connected to a watchband of the watch; when users wear the watch and rotate the first middle frame 10, the substrate module 80 is limited by the watchband and cannot rotate, that is, the third gear 43 is fixed without rotating, thereby achieving switching between the unfolded state and the folded state of the display device 100.

It should be noted that in some embodiments, the driving assembly may also include a motor which uses electrodes to drive the first gear 41 to rotate. That is, the substrate module 80, second gear 42, rotation axis 44, and third gear 43 can be replaced by the motor.

In some embodiments, the driving assembly may also include a knob disposed on an outer side of a side wall of the first frame body. The rotation axis 44 passes through the side wall of the first frame body and connected to the knob. By rotating the knob, the rotating shaft 44 can be driven to drive the first gear 41 to rotate. That is, the substrate module 80, the second gear 42, and the third gear 43 can be replaced by the knob.

Optionally, two first gears 41 are fixed on the rotation axis 44 to synchronize two groups of linkage assemblies.

Optionally, a quantity of the second gears 42 can also be two. Two second gears 42 are disposed opposite to each other. One third gear 43 simultaneously is engaged with two second gears 42 to improve driving stability.

Optionally, the latch 82 may be integrally formed with the substrate 81. Alternatively, the latch 82 may be fixed on the substrate 81 by a physical method, such as though an adhesive connection, a threaded connection, an interference connection, or a clamping connection.

It should be noted that there are various methods of fixed connections between the third gear 43 and the latch 82. For example, the third gear 43 and the latch 82 may be integrally formed; further, for example, the third gear 43 and the latch 82 may be fixed by a mechanical method, such as though an adhesive connection, a threaded connection, an interference connection, or a buckle connection.

Figure 5:
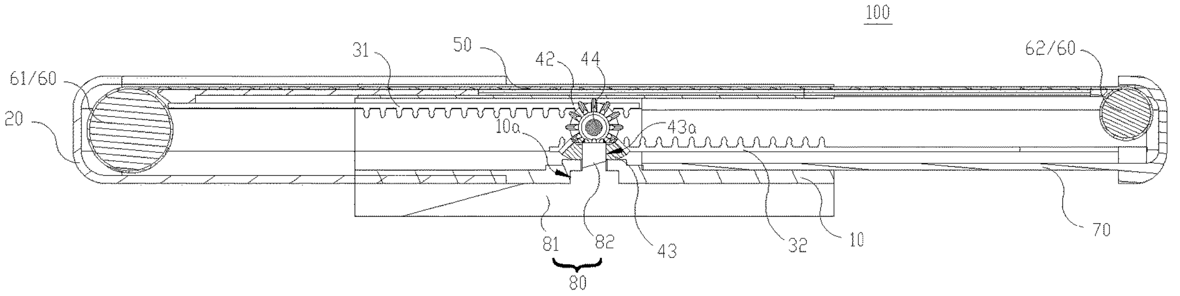
FIG. 5 is a schematic cross-sectional diagram of FIG. 3.
Figure 7:
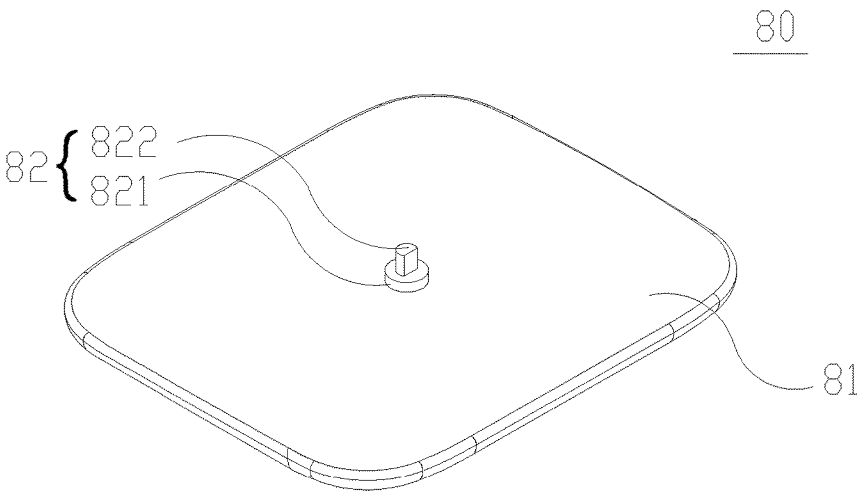
FIG. 7 is a schematic structural diagram of a substrate module in the display device provided by the embodiment of the present disclosure.

Optionally, please refer to FIG. 7 and FIG. 5, the latch 82 includes a rotating part 821 and a clamping part 822 disposed on the rotating part 821. A bottom of the first middle frame 10 is provided with a through-hole 10*a*. The third gear 43 is provided with a clamping hole 43*a*.

The rotating part 821 is disposed in the through-hole 10*a* and rotatably connected to the bottom of the first middle frame 10. The clamping part 822 is clamped inside the clamping hole 43*a*.

In some embodiments, based on the above-mentioned structure, the third middle frame 70 may also be omitted in the display device 100, that is, only the first middle frame 10 and the second middle frame 20 are disposed slidably.

In an embodiment where only the first middle frame 10 and the second middle frame 20 are slidably disposed relative to each other, the above-mentioned driving assembly is still used to drive the first gear 41 to rotate.

In an embodiment where only the first middle frame 10 and the second middle frame 20 are slidably disposed relative to each other, the first middle frame 10 is rotationally connected to the substrate module 80, and the latch 82 is clamped with the third gear 43, and the third gear 43 is fixed without rotating, so that the substrate module 80 and the first middle frame 10 can rotate relative to each other. By rotating the first middle frame 10, the second gear 42 can rotate with rotation of the first middle frame 10, that is, the second gear 42 rotates around a circumferential direction of the third gear 43; and due to a relative rotation of the second gear 42 and the third gear 43 in the circumferential direction, the second gear 42 is prompted to rotate in a vertical direction, which in turn drives the rotation axis 44 and the first gear 41 disposed on the rotation axis 44; subsequently, the first gear 41 drives the first rack 31 and the second rack 32 to move towards directions away from each other, enabling the second middle frame 20 and the third middle frame 70 to move towards directions away from each other, so as to unfold the flexible panel 50. If the first middle frame 10 is rotated in a reverse direction, the second middle frame 20 and the third middle frame 70 are close to each other, and the display device 100 switches from the unfolded state to the folded state, causing the flexible panel 50 to be rolled up. The rolling up element 60 may be disposed inside the first middle frame 10 and/or the second middle frame 20.

Figure 8:
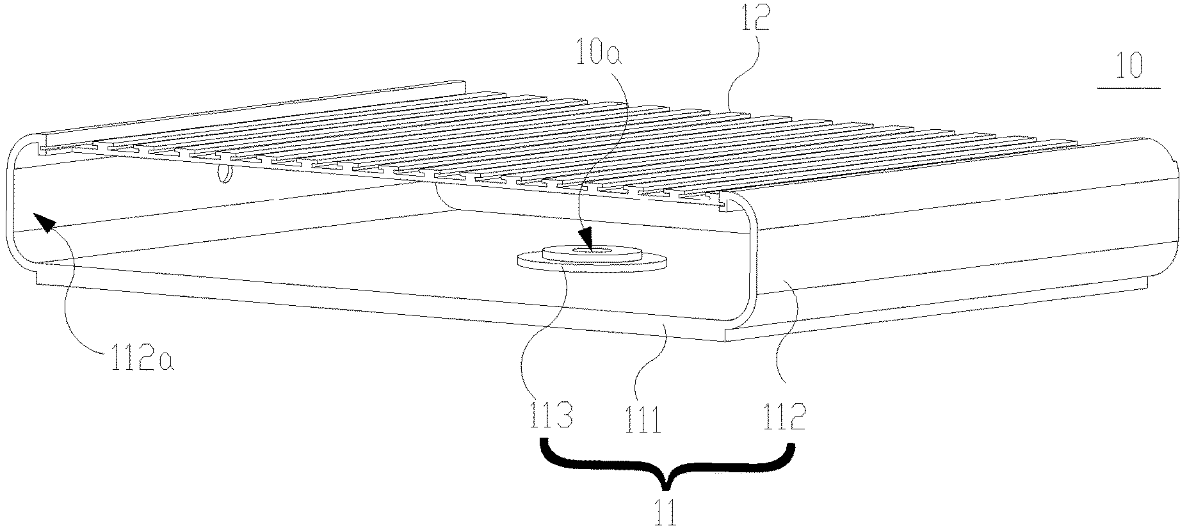
FIG. 8 is a schematic structural diagram of a first middle frame in the display device provided by the embodiment of the present disclosure.

Please refer to FIG. 8, the first frame body 11 includes a first bottom 111, first side plates 112, and a protrusion boss 113. The first side plates 112 are disposed on opposite sides of the first bottom 111. The protrusion boss 113 is disposed on the first bottom 111. The through-hole 10*a* passes through the protrusion boss 113, and the third gear 43 is disposed on the protrusion boss 113. The first support body 12 is connected to two first side plates 112 disposed opposite to each other.

The first side plate 112 is bent into a convex groove body. An inner side of the first side plate 112 defines a first insertion slot 112*a*.

Figure 9:
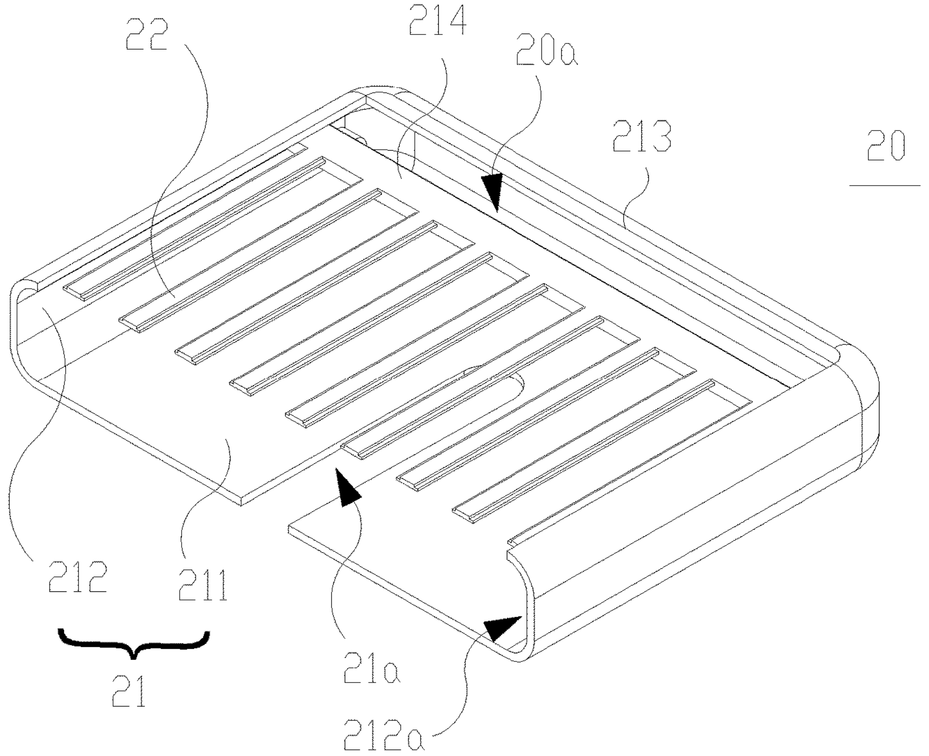
FIG. 9 is a schematic structural diagram of a second middle frame in the display device provided by the embodiment of the present disclosure.

Please refer to FIG. 9, the second frame body 21 includes a second bottom 211, second side plates 212, a first end plate 213, and a first connection strip 214.

The second side plates 212 are disposed on opposite sides of the second bottom 211. The second side plate 212 is bent into a convex groove body. An inner surface of the second side plate 212 defines a second insertion slot 212*a*.

The first end plate 213 is disposed on the second bottom 211 and connected to same ends of the two second side plates 212. The other end of the two second side plates 212 is provided with an opening.

The first connection strip 214 is connected to a side of the two second side plates 212 close to the first end plate 213. An end of a plurality of second support bodies 22 is connected to a side of the first connection strip 214 away from the first end plate 213.

A first accommodating space of 20*a* is defined between the first connection strip 214 and the first end plate 213.

Figure 10:
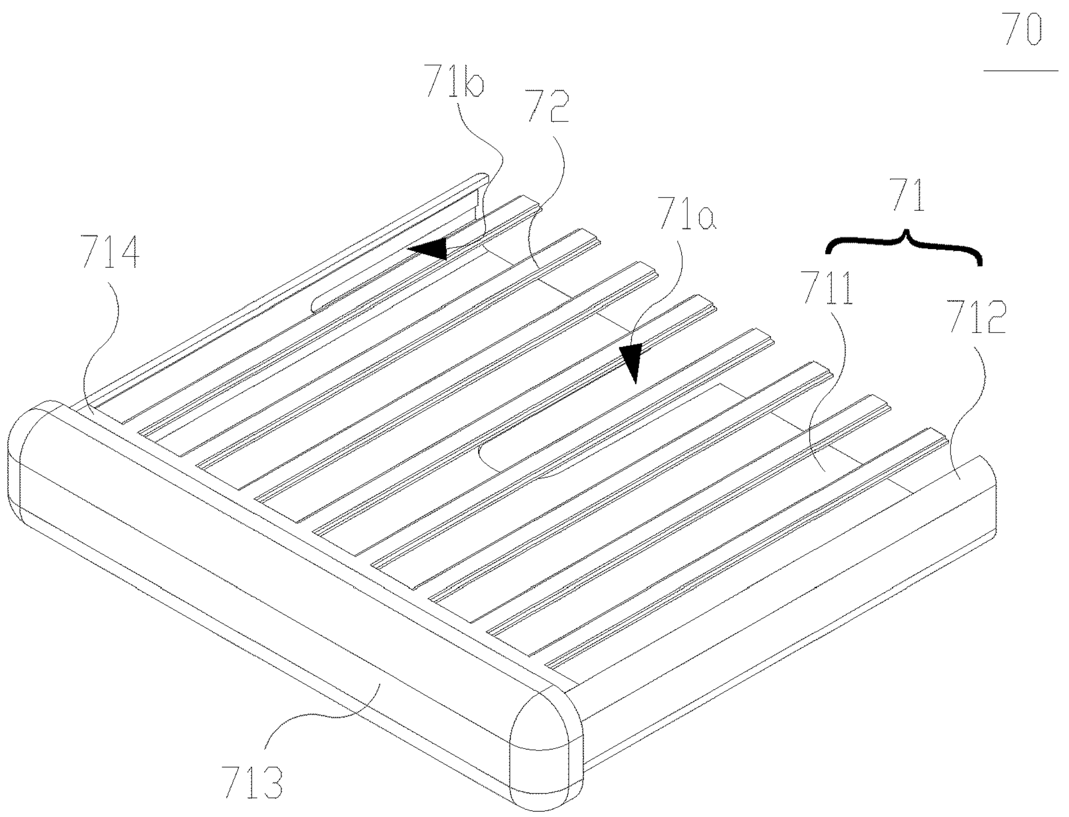
FIG. 10 is a schematic structural diagram of a third middle frame in the display device provided by the embodiment of the present disclosure.

Please refer to FIG. 10 and FIG. 6, the third frame body 71 includes a third bottom 711, third side plates 712, a second end plate 713, and a second connection strip 714.

The third side plates 712 are disposed on opposite sides of the third bottom 711. The third side plate 712 is bent into a convex groove body.

The second end plate 713 is disposed on the third bottom 711 and connected to same ends of two third side plates 712. The other end of the two third side plates 712 is provided with an opening. The second end plate 713 is disposed opposite to the first end plate 213. Two side parts of the second end plate 713 protrude from the third side plates 712, respectively.

The second connection strip 714 is connected to a side of the two third side plates 712 close to the second end plate 713. An end of a plurality of third support bodies 72 is connected to a side of the second connection strip 714 away from the second end plate 713.

A second accommodating space of 70*a* is defined between the second connection strip 714 and the second end plate 713.

The rotation axis 44 is connected to the first side plate 112 disposed opposite to each other.

The first rack 31 is connected to a side of the first connection strip 214 close to the second bottom 211, and the second rack 32 is fixedly connected to the third bottom 711. Alternatively, the first rack 31 is fixedly connected to the second bottom 211, and the second rack 32 is connected to a side of the second connection strip 714 close to the third bottom 711.

Please refer to FIG. 11, and FIG. 8 to FIG. 10, optionally, the first frame body 11 is inserted into the second frame body 21, and the third frame body 71 is inserted into the first frame body 11.

The first side plate 112 of the first frame body 11 is inserted into the second insertion slot 212*a*, and the third side plate 712 of the third frame body 71 is inserted into the first insertion slot 112*a*. A protrusion part of the second end plate 713 is configured to limit and block the first side plate 112 and the second side plate 212.

A bottom of the second frame body 21 (a second bottom 211) is provided with a first opening channel 21*a* configured to dodge the latch 82. A bottom of the third frame body 71 (a third bottom 711) is provided with a second opening channel 71*a* configured to dodge the third gear 43 and the protrusion boss 113. A side wall of the third frame body 71 (the third side plate 712) is equipped with a third opening channel 71*b* configured to dodge the rotation axis 44.

A design of the first opening channel 21*a*, the second opening channel 71*a*, and the third opening channel 71*b* can achieve relative sliding of the first middle frame 10, the second middle frame 20, and the third middle frame 70, thereby achieving unfolding and folding of the display device 100.

In some embodiments, both the second frame body 21 and the third frame body 71 can be inserted into an inner side of the first frame body 11 or an outer side of the first frame body 11.

In the display device 100 of the embodiment, the second frame body 21 and the inner side of the first frame body 11 are connected slidably, and the third frame body 71 and the outer side of the first frame body 11 are connected slidably, so that an overlap area of the first frame body 11, the second frame body 21, and the third frame body 71 is maximized when the display device 100 is in the folded state, thereby achieving an effect of saving space.

Figure 11:
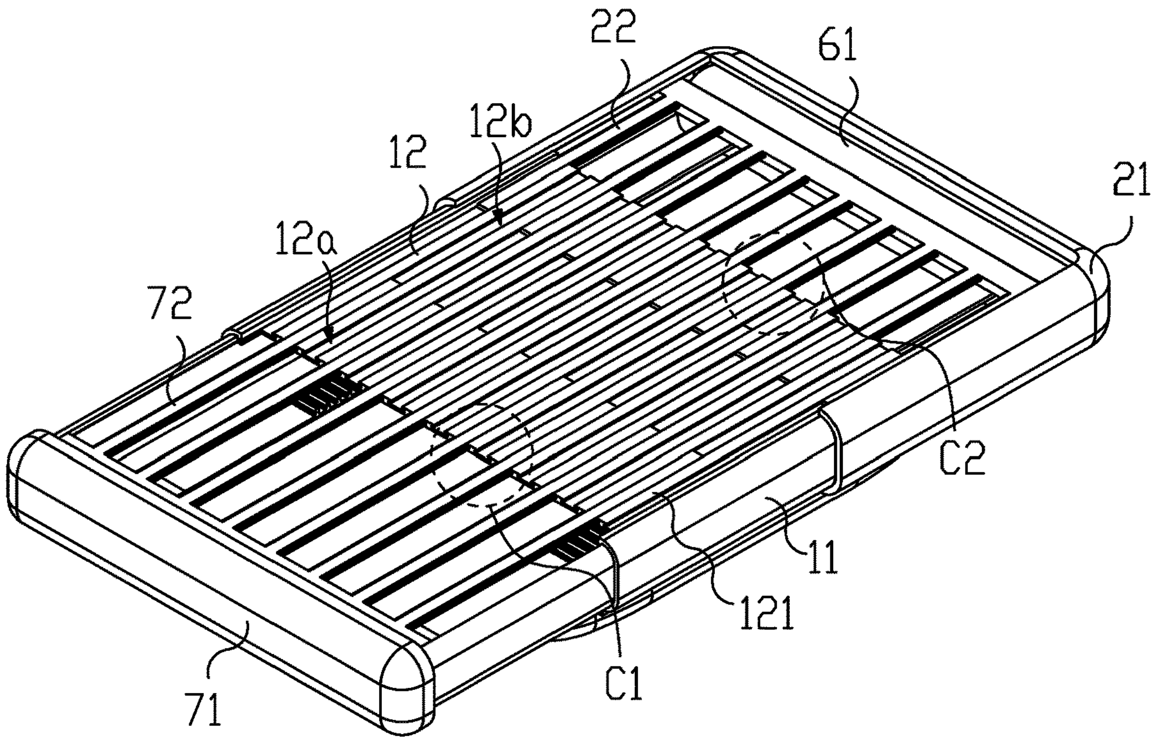
FIG. 11 is a schematic structural diagram of an insertion of the first middle frame, the second middle frame, and the third middle frame in the display device provided by the embodiment of the present disclosure.

Optionally, please refer to FIG. 11, the first support body 12 is connected to opposite sides of the first frame body 11 (the first side plates 112). The first support body 12 includes a support part 121. The first support body 12 is provided with a first chute 12*a* and a second chute 12*b*. The support part 121 is provided between the first chute 12*a* and the second chute 12*b*.

The second support body 22 is slidably disposed inside the first chute 12*a*. The third support 72 is slidably disposed inside the second chute 12*b*.

The second support body 22 and the third support body 72 are respectively disposed inside chutes of the first support body 12, which realizes a sliding connection of the first middle frame 10, the second middle frame 20, and the third middle frame 70, and enables the support part 121 of the first support body 12, the second support body 22, and the third support body 72 to be flush with a support surface configured to support the flexible panel 50.

Optionally, the support part 121, the second support 22, and the third support 72 are alternately disposed in sequence.

When the display device 100 is in the unfolded state, the support part 121 inside the first middle frame 10, the second support body 22 inside the second middle frame 20, and the third support 72 inside the third middle frame 70 can uniformly support the flexible panel 50.

Figure 12:
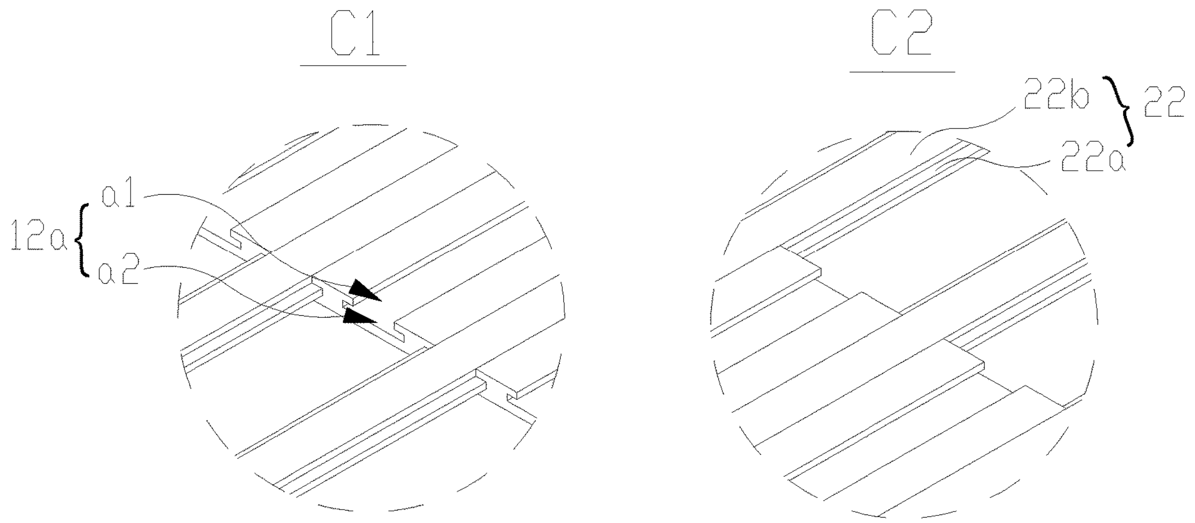
FIG. 12 is an enlarged diagram at a position C1 and at a position C2 in FIG. 11.

Optionally, please refer to FIG. 12. The first chute 12*a* includes an upper slot a1 and a lower slot a2 interconnected to each other, and a width of the lower slot a2 is greater than a width of the upper slot a1.

The second support body 22 includes a lower support part 22*a* and an upper support part 22*b* disposed on the lower support part 22*a*. A width of the upper support part 22*b* is less than a width of the lower support part 22*a*.

The upper support part 22*b* is disposed inside the upper slot a1, and the lower support part 22*a* is disposed inside the lower slot a2.

A design of the first chute 12*a* being a limiting slit can avoid the second support body 22 from detaching from the first chute 12*a*, so that the second support body 22 can slide along an extension direction of the first chute 12*a*.

Similarly, the second chute 12*b* is also a limiting slit, and the third support body 72 is also a structure including an upper part with a greater width and a lower part with a less width. The third support body 72 is inserted and limited into the second chute 12*b* to avoid the third support body 72 from detaching from the second chute 12*b*, so that the third support body 72 can slide along an extension direction of the second chute 12*b*.

Figure 13:
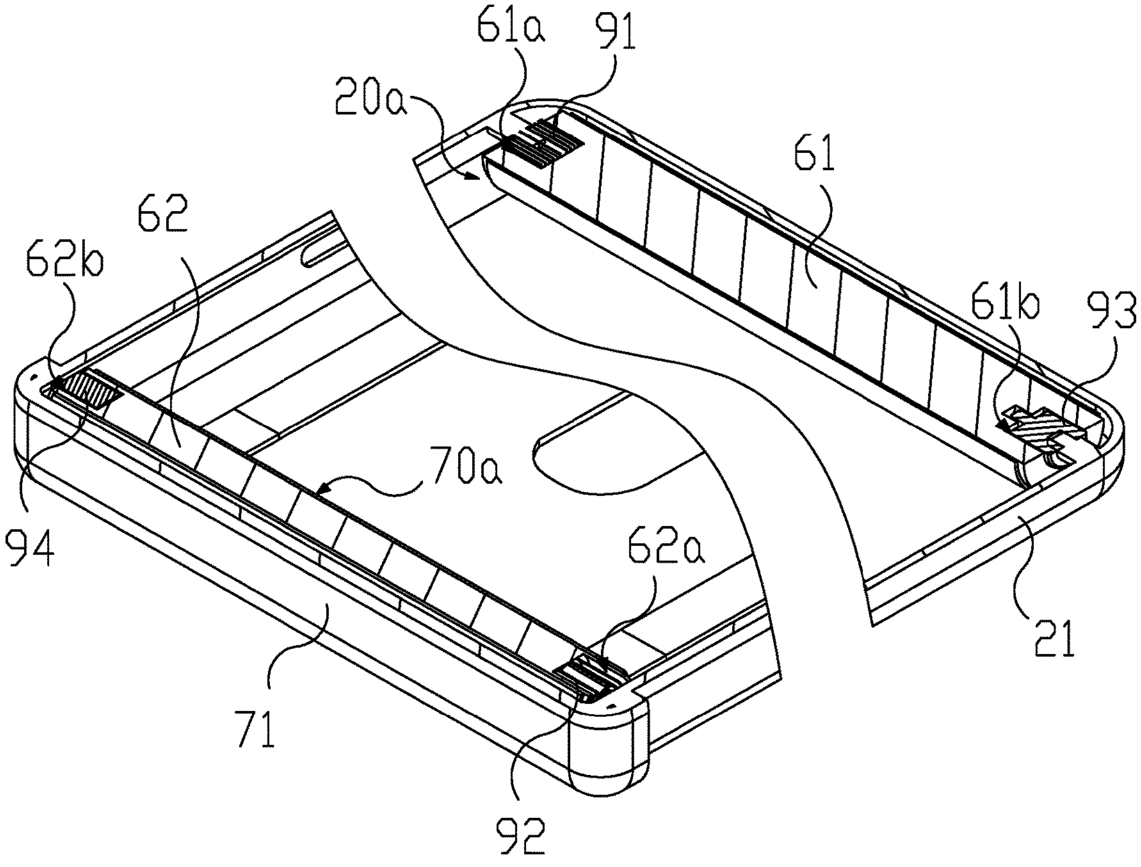
FIG. 13 is a second schematic partial structural diagram of the display device provided by the embodiment of the present disclosure.

Optionally, please refer to FIG. 11 and FIG. 13, the rolling up element 60 includes a first rolling up element 61 and a second rolling up element 62. The first rolling up element 61 is rotationally disposed on a side of the second frame body 21 away from the third middle frame 70. The second rolling up element 62 is rotationally disposed on a side of the third frame body 71 away from the second middle frame 20.

That is, the first rolling up element 61 is disposed in the first accommodating space 20*a*, and the second rolling up element 62 is disposed in the second accommodating space 70*a*.

Optionally, the rolling up element 61 may be a device with a winding function, such as a shaft or a cylinder.

An end of the flexible panel 50 is connected to a peripheral side surface of the first rolling up element 61. The other end of the flexible panel 50 is connected to a peripheral side surface of the second rolling up element 62.

An end part of the first rolling up element 61 is provided with a first accommodating hole 61*a*. An end part of the second rolling up element 62 is provided with a second accommodating hole 62*a*.

The display device 100 also includes a first coil spring 91 and a second coil spring 92. The first coil spring 91 is disposed in the first accommodating hole 61*a*. An end of the first coil spring 91 is fixedly connected to the first rolling up element 61, and the other end of the first coil spring 91 is fixedly connected to the second frame body 21. Specifically, the other end of the first coil spring 91 is fixedly connected to the second side plate 212 of the second frame body 21.

The second coil spring 92 is disposed in the second accommodating hole 62*a*. An end of the second coil spring 92 is fixedly connected to the second rolling up element 62, and the other end of the second coil spring 92 is fixedly connected to the third frame body 71. Specifically, the other end of the second coil spring 92 is fixedly connected to the third side plate 712 of the third frame body 71.

It should be noted that the first coil spring 91 and the second coil spring 92 respectively provide torque force to the first rolling up element 61 and the second rolling up element 62, so that the first rolling up element 61 and the second rolling up element 62 can automatically roll up the flexible panel 50 when the display device 100 switches from the unfolded state to the folded state; and when the display device 100 is in the unfolded state, it makes the flexible panel 50 tight and not undulating, which reduces a risk of wrinkles of the flexible panel 50.

Figure 14:
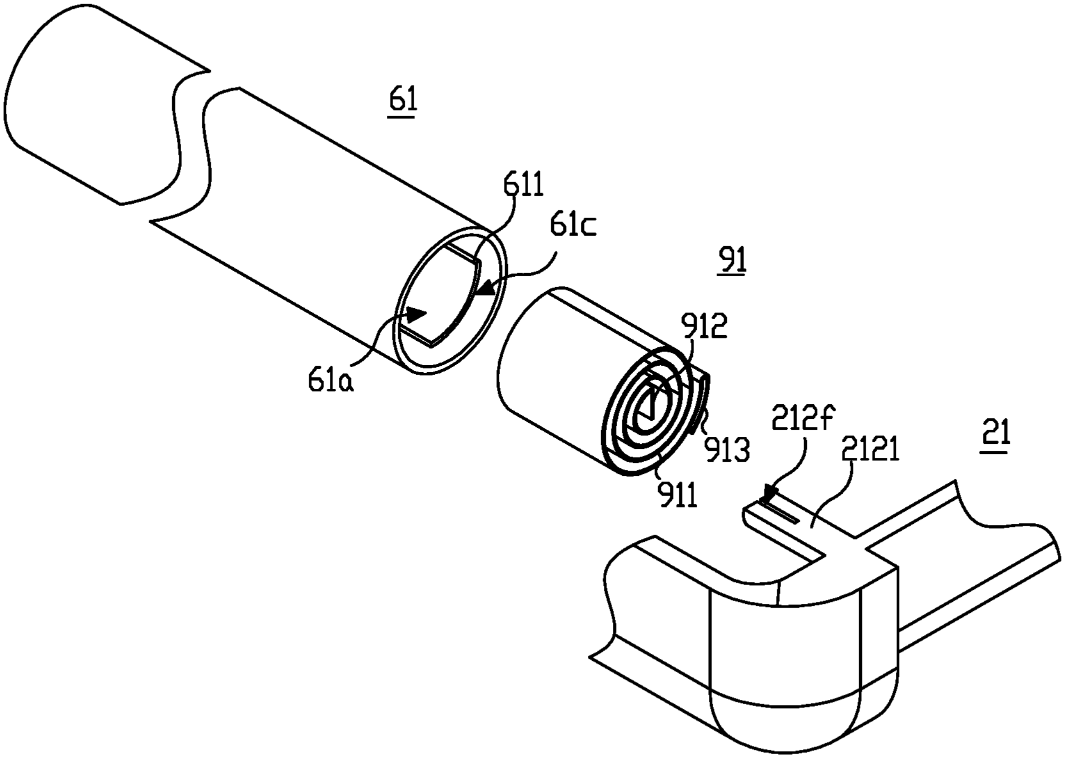
FIG. 14 is a schematic connective structural diagram of a first coil spring in the display device provided by the embodiment of the present disclosure.

Optionally, please refer to FIG. 14. The first coil spring 91 includes a coil spring body 911, a first buckle part 912, and a second buckle part 913. The first buckle part 912 is connected to an inner side end of the coil spring body 911, and the second buckle part 913 is connected to an outer side end of the coil spring body 911.

An extension direction of the first buckle part 912 intersects with an extension direction of the coil spring body 911.

The second buckle part 913 is bent from an outer end part of the coil spring body 911 and extends along a direction opposite to the extension direction of the coil spring body 911. A gap is defined between the second buckle part 913 and the coil spring body 911.

The first rolling up element 61 includes a limiting sheet 611. The limiting sheet 611 is disposed in the first accommodating hole 61*a*. A buckle space 61*c* is defined between the limiting sheet 611 and a side wall of the first accommodating hole 61*a*.

A side of the second side plate 212 close to the first rolling up element 61 is equipped with an insertion part 2121, and a buckle opening 212*f* is defined on the insertion part 2121.

The insertion part 2121 is disposed inside the coil spring body 911, and the first buckle part 912 is disposed in the buckle opening 212*f*. The limiting sheet 611 is inserted into the gap, and the second buckle part 913 is inserted into the buckle space 61*c*.

Optionally, a structure of the second coil spring 92 is similar to or the same as a structure of the first coil spring 91.

Optionally, please refer to FIG. 13. The other end part of the first rolling up element 61 is provided with a third accommodating hole 61*b*. The other end part of the second rolling up element 62 is provided with a fourth accommodating hole 62*b*.

The display device 100 also includes a first damper 93 and a second damper 94. The first damper 93 is disposed in the third accommodating hole 61*b*. An end of the first damper 93 is fixedly connected to the first rolling up element 61, and the other end of the first damper 93 is fixedly connected to the second frame body 21. Specifically, the other end of the first damper 93 is fixedly connected to the second side plate 212 of the second frame body 21.

The second damper 94 is disposed in the fourth accommodating hole 62*b*. An end of the second damper 94 is fixedly connected to the second rolling up element 62, and the other end of the second damper 94 is fixedly connected to the third frame body 71. Specifically, the other end of the second damper 94 is fixedly connected to the third side plate 712 of the third frame body 71.

It should be noted that the first damper 93 and the second damper 94 respectively provide damping for the first rolling up element 61 and the second rolling up element 62, enabling the first rolling up element 61 and the second rolling up element 62 to roll up and release the flexible panel 50 at a constant speed.

In the embodiment, the first middle frame 10, the second middle frame 20, and the third middle frame 70 are combined to define a middle frame module. That is, the middle frame module is disposed on the substrate module 80 and rotationally connected to the substrate module 80.

The embodiment can achieve a switching between the folded state and the unfolded state of the display device 100 through a relative rotation of the middle frame module and the substrate module 80.

When rotating the middle frame module, the middle frame module rotates relative to the substrate module 80. The third gear 43 is clamped with the latch 82 and engaged with the second gear 42. Both the second gear 42 and the first gear 41 are disposed on the rotation axis 44, and an upper end and a lower end of the first gear 41 are correspondingly engaged with the first rack 31 and the second rack 32, respectively. In addition, the first rack 31 is fixedly connected to the second middle frame 20, and the second rack 32 is fixedly connected to the third middle frame 70.

Therefore, when the middle frame module rotates, the third gear 43 can indirectly enable the first rack 31 and the second rack 32 to move towards opposite directions, and the second middle frame 20 and the third middle frame 70 are away from each other, so as to achieve unfolding of the display device 100; at this time, the rolling up element 60 releases the flexible panel 50, and the first coil spring 91 and the second coil spring 92 gradually tighten.

When the middle frame module rotates in an opposite direction, the second middle frame 20 and the third middle frame 70 are close to each other, which can achieve folding of the display device 100; at this time, the rolling up element 60 rolls up the flexible panel 50 due to an effect of the first coil spring 91 and the second coil spring 92.

Figure 15:
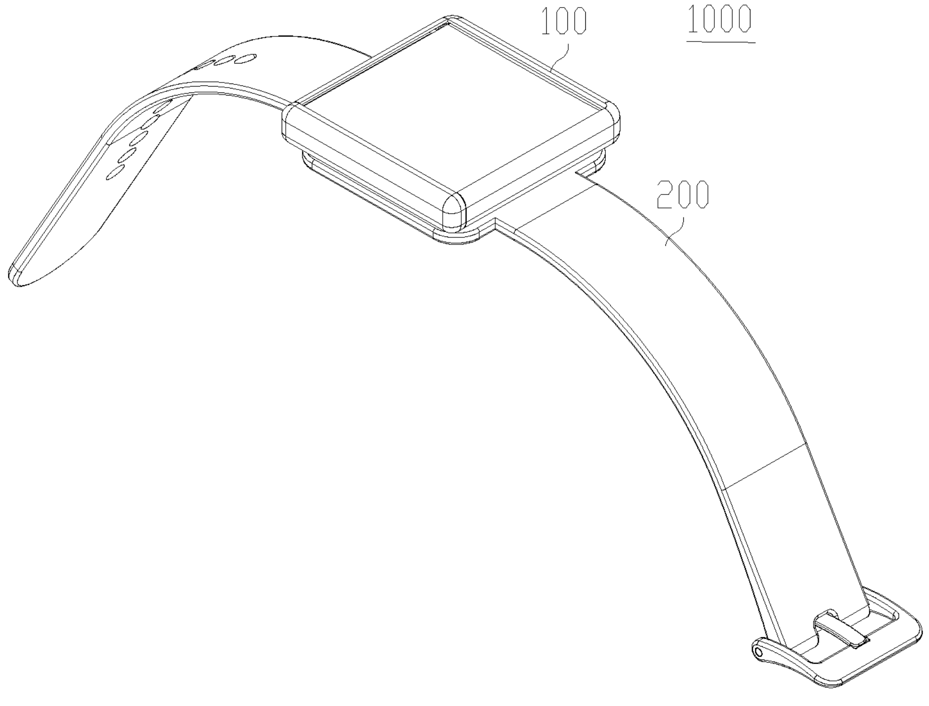
FIG. 15 is a schematic structural diagram of a watch provided by an embodiment of the present disclosure.

Correspondingly, please refer to FIG. 15. An embodiment of the present disclosure also provides a watch 1000 including a watchband 200 and the display device 100 according to any of the above-mentioned embodiments. The watchband 200 is connected to a side of the substrate 81.

Optionally, the watchband 200 may be integrally formed with the substrate module 80, fixedly connected to the substrate module 80, or detachably connected to the substrate module 80.

It should be noted that a structure of the display device 100 of the watch 100 in the embodiment is similar or the same as a structure of the display device 100 in any of the above-mentioned embodiments. Details of the display device 100 can refer to the description of the above-mentioned embodiments, and will not be repeated here.

In the display device 100 of the watch 1000 provided by the embodiment of the present disclosure, the first rack 31 is fixedly disposed on the second middle frame 20, and the first gear 41 is disposed inside the first fame body 11 and engaged with the first rack 31, so that the second middle frame 20 and the first middle frame 10 can be disposed slidably; the flexible panel 50 is disposed on the first support body 12 of the first middle frame 10 and the second support body 22 of the second middle frame 20, and the rolling up element 60 is configured to roll up the flexible panel 50.

When the display device 100 is in the folded state, the second middle frame 20 and the first middle frame 10 are close to each other, and a part of the flexible panel 50 is rolled up by the rolling up element 60; when the display device 100 is in the unfolded state, the second middle frame 20 and the first middle frame 10 are away from each other, and the flexible panel 50 is released from the rolling up element 60.

By adopting an engagement of the first rack 31 and the first gear 41, the first middle frame 10 and the second middle frame 20 can be driven to slide, so as to control sliding of the first middle frame 10 and the second middle 20 precisely, thereby controlling folding states of the flexible panel 50 precisely.

A principle of unfolding and folding of the watch 1000 is as following:

due to a fact that the substrate module 80 is fixed on the watchband 200, when users wear the watch 1000, due to a fact that the watchband 200 restricts rotation of the substrate module 80, the first middle frame 10 is rotationally connected to the substrate module 80, and the latch 82 is fixedly connected to the third gear 43, therefore, the third gear 43 can be fixed without rotating, so that the substrate module 80 and the first middle frame 10 can rotate relative to each other. Further, due to a fact that the rotation axis 44 is rotatably fixed on the first middle frame 10, and the second gear 42 is sleeved on the rotation axis 44, by rotating the first middle frame 10, the second gear 42 can rotate with rotation of the first middle frame 10, that is, the second gear 42 rotates around a circumferential direction of the third gear 43; and due to a relative rotation of the second gear 42 and the third gear 43 in the circumferential direction, the second gear 42 is prompted to rotate in a vertical direction, which in turn drives the rotation axis 44 and the first gear 41 disposed on the rotation axis 44; subsequently, the first gear 41 drives the first rack 31 and the second rack 32 to move towards directions away from each other, enabling the second middle frame 20 and the third middle frame 70 to move towards directions away from each other, so as to unfold the flexible panel 50. If the first middle frame 10 is rotated in a reverse direction, the second middle frame 20 and the third middle frame 70 are close to each other, and the display device 100 switches from the unfolded state to the folded state, causing the flexible panel 50 to be rolled up.

The display device and the watch provided by the embodiments of the present disclosure are described in detail. In this paper, specific embodiments are adopted to illustrate a principle and implementation modes of the present disclosure. The description of the above-mentioned embodiments is only used to help understand methods and a core idea of the present disclosure. At the same time, for those skilled in the art, according to the idea of the present disclosure, there will be changes in specific implementation modes and a scope of the present disclosure. In conclusion, contents of the specification should not be interpreted as a limitation of the present disclosure.

What is claimed is:

1. A display device, comprising:

a first middle frame, wherein the first middle frame comprises a first frame body and a first support body disposed on the first frame body;

a second middle frame, wherein the second middle frame and the first middle frame are disposed slidably, and the second middle frame comprises a second frame body and a second support body disposed on the second frame body;

a first rack, wherein the first rack is fixedly disposed on the second middle frame;

a first gear, wherein the first gear is disposed inside the first frame body and engaged with the first rack;

a driving assembly, wherein the driving assembly is disposed inside the first middle frame and configured to drive the first gear to rotate; the driving assembly comprises a rotation axis, a second gear, a third gear, and a substrate module; the rotation axis is disposed inside the first middle frame; the second gear is sleeved on a peripheral side of the rotation axis and disposed on a side of the first gear; the third gear is disposed inside the first middle frame; the substrate module is configured to be fixed on an external member, and the substrate module comprises a substrate and a latch disposed on the substrate;

a flexible panel, wherein the flexible panel is disposed on the first support body and the second support body;

a rolling up element, wherein the rolling up element is configured to roll up the flexible panel; and a third middle frame, wherein the third middle frame comprises a third frame body and a third support body disposed on the third frame body; the first frame body is inserted into the second frame body, and the third frame body is inserted into the first frame body;

wherein a bottom of the second frame body is provided with a first opening channel configured to dodge the latch; a bottom of the third frame body is provided with a second opening channel configured to dodge the third gear; a side wall of the third frame body is equipped with a third opening channel configured to dodge the rotation axis.

2. The display device of claim 1, wherein the rotation axis is rotatably connected to a side wall of the first frame body and configured to drive the first gear to rotate; and wherein the first gear is sleeved on a peripheral side of the rotation axis.

3. The display device of claim 1, wherein the display device further comprises a second rack, one of the second rack and the first rack is located above the first gear, and another one of the second rack and the first rack is located below the first gear; and the third middle frame and the first middle frame are disposed slidably; the second rack is fixedly disposed on the third middle frame and engaged with the first gear; the flexible panel is further disposed on the third support body.

4. The display device of claim 1, wherein the first middle frame is disposed on the substrate module; the latch passes through a bottom of the first frame body and extends into the first frame body, and the third gear is fixedly connected to the latch; and the first middle frame is rotatably connected to the latch; and the second gear and the third gear are engaged with each other and are both bevel gears.

5. The display device of claim 1, wherein the latch comprises a rotating part and a clamping part disposed on the rotating part; a bottom of the first middle frame is provided with a through-hole, and the third gear is provided with a clamping hole;

the rotating part is disposed in the through-hole and rotationally connected to the bottom of the first middle frame, and the clamping part is clamped in the clamping hole.

6. The display device of claim 1, wherein the first support body is connected to opposite sides of the first frame body; the first support body comprises a support part and is provided with a first chute and a second chute, and the support part is disposed between the first chute and the second chute; and the second support body is slidably disposed inside the first chute, and the third support body is slidably disposed inside the second chute.

7. The display device of claim 6, wherein the support part, the second support body, and the third support body are alternately disposed in sequence.

8. The display device of claim 6, wherein the first chute comprises an upper slot and a lower slot interconnected to each other, and a width of the lower slot is greater than a width of the upper slot;

the second support body comprises a lower support part and an upper support part disposed on the lower support part, and a width of the upper support part is less than a width of the lower support part; and the upper support part is disposed in the upper slot, and the lower support part is disposed in the lower slot.

9. The display device of claim 1, wherein the rolling up element comprises a first rolling up element and a second rolling up element, the first rolling up element is rotationally disposed on a side of the second frame body away from the third middle frame, and the second rolling up element is rotationally disposed on a side of the third frame body away from the second middle frame;

an end of the flexible panel is connected to a peripheral side surface of the first rolling up element, and another end of the flexible panel is connected to a peripheral side surface of the second rolling up element;

an end part of the first rolling up element is provided with a first accommodating hole, and an end part of the second rolling up element is provided with a second accommodating hole; and the display device further comprises a first coil spring and a second coil spring; the first coil spring is disposed in the first accommodating hole, an end of the first coil spring is fixedly connected to the first rolling up element, and another end of the first coil spring is fixedly connected to the second frame body; the second coil spring is disposed in the second accommodating hole, an end of the second coil spring is fixedly connected to the second rolling up element, and another end of the second coil spring is fixedly connected to the third frame body.

10. The display device of claim 9, wherein another end part of the first rolling up element is provided with a third accommodating hole, and another end part of the second rolling up element is provided with a fourth accommodating hole;

the display device further comprises a first damper and a second damper; the first damper is disposed in the third accommodating hole, an end of the first damper is fixedly connected to the first rolling up element, and another end of the first damper is fixedly connected to the second frame body; the second damper is disposed in the fourth accommodating hole, an end of the second damper is fixedly connected to the second rolling up element, and another end of the second damper is fixedly connected to the third frame body.

11. The display device of claim 9, wherein the first coil spring comprises a coil spring body, a first buckle part, and a second buckle part;

wherein the first buckle part is connected to an inner side end of the coil spring body, and an extension direction of the first buckle part intersects with and is substantially perpendicular to an extension direction of the coil spring body; and wherein the second buckle part is connected to an outer side end of the coil spring body, and bent from an outer end part of the coil spring body and extends along a direction opposite to the extension direction of the coil spring body, and a gap is defined between the second buckle part and the coil spring body.

12. The display device of claim 11, wherein the first rolled-up element comprises a limiting sheet disposed in the first accommodating hole, a buckle space is defined between the limiting sheet and a side wall of the first accommodating hole;

wherein a side of the second side plate close to the first rolled-up element is equipped with an insertion part which is disposed inside the coil spring body, and a buckle opening is defined on the insertion part;

wherein the first buckle part is disposed in the buckle opening, the limiting sheet is inserted into the gap, and the second buckle part is inserted into the buckle space.

13. A watch, comprising a watchband and a display device, wherein the display device comprises:

a first middle frame, wherein the first middle frame comprises a first frame body and a first support body disposed on the first frame body;

a second middle frame, wherein the second middle frame and the first middle frame are disposed slidably, and the second middle frame comprises a second frame body and a second support body disposed on the second frame body;

a first rack, wherein the first rack is fixedly disposed on the second middle frame;

a first gear, wherein the first gear is disposed inside the first frame body and engaged with the first rack;

a driving assembly, wherein the driving assembly is disposed inside the first middle frame and configured to drive the first gear to rotate; the driving assembly comprises a rotation axis, a second gear, a third gear, and a substrate module; the rotation axis is disposed inside the first middle frame; the second gear is sleeved on a peripheral side of the rotation axis and disposed on a side of the first gear; the third gear is disposed inside the first middle frame; the watchband is connected to a side of the substrate module, and the substrate module comprises a substrate and a latch disposed on the substrate;

a flexible panel, wherein the flexible panel is disposed on the first support body and the second support body;

a rolling up element, wherein the rolling up element is configured to roll up the flexible panel; and a third middle frame, wherein the third middle frame comprises a third frame body and a third support body disposed on the third frame body; the first frame body is inserted into the second frame body, and the third frame body is inserted into the first frame body;

wherein a bottom of the second frame body is provided with a first opening channel configured to dodge the latch; a bottom of the third frame body is provided with a second opening channel configured to dodge the third gear; a side wall of the third frame body is equipped with a third opening channel configured to dodge the rotation axis.

14. The watch of claim 13, wherein the latch passes through a bottom of the first frame body and extends into the first frame body, and the third gear is fixedly connected to the latch; and the first middle frame is rotatably connected to the latch; and the second gear and the third gear are engaged with each other and are both bevel gears.

15. The watch of claim 13, wherein the latch comprises a rotating part and a clamping part disposed on the rotating part; a bottom of the first middle frame is provided with a through-hole, and the third gear is provided with a clamping hole; and the rotating part is disposed in the through-hole and rotationally connected to the bottom of the first middle frame, and the clamping part is clamped in the clamping hole.

16. The watch of claim 13, wherein the first support body is connected to opposite sides of the first frame body; the first support body comprises a support part and is provided with a first chute and a second chute, and the support part is disposed between the first chute and the second chute; and the second support body is slidably disposed inside the first chute, and the third support body is slidably disposed inside the second chute.

17. The watch of claim 13, wherein the rotation axis is rotatably connected to a side wall of the first frame body and configured to drive the first gear to rotate, and the first gear is sleeved on a peripheral side of the rotation axis;

wherein the display device further comprises a second rack, one of the second rack and the first rack is located above the first gear, and another one of the second rack and the first rack is located below the first gear; the third middle frame and the first middle frame are disposed slidably; the second rack is fixedly disposed on the third middle frame and engaged with the first gear; the flexible panel is further disposed on the third support body.

18. A display device, comprising:

a first middle frame, wherein the first middle frame comprises a first frame body and a first support body disposed on the first frame body; the first support body comprises a support part and is provided with a first chute and a second chute, and the support part is disposed between the first chute and the second chute;

a second middle frame, wherein the second middle frame and the first middle frame are disposed slidably, and the second middle frame comprises a second frame body and a second support body disposed on the second frame body;

a first rack, wherein the first rack is fixedly disposed on the second middle frame;

a first gear, wherein the first gear is disposed inside the first frame body and engaged with the first rack;

a driving assembly, wherein the driving assembly is disposed inside the first middle frame and configured to drive the first gear to rotate;

a flexible panel, wherein the flexible panel is disposed on the first support body and the second support body; and a rolling up element, wherein the rolling up element is configured to roll up the flexible panel;

wherein the first chute comprises an upper slot and a lower slot interconnected to each other, and a width of the lower slot is greater than a width of the upper slot; the second support body comprises a lower support part and an upper support part disposed on the lower support part, and a width of the upper support part is less than a width of the lower support part; and the upper support part is disposed in the upper slot, and the lower support part is disposed in the lower slot.

19. The display device of claim 18, wherein the rotation axis is rotatably connected to a side wall of the first frame body and configured to drive the first gear to rotate, and the first gear is sleeved on a peripheral side of the rotation axis;

the first middle frame is disposed on the substrate module;

the latch passes through a bottom of the first frame body and extends into the first frame body, and the third gear is fixedly connected to the latch; and the first middle frame is rotatably connected to the latch; and the second gear and the third gear are engaged with each other and are both bevel gears.

20. The display device of claim 18, wherein the display device further comprises a second rack, one of the second rack and the first rack is located above the first gear, and another one of the second rack and the first rack is located below the first gear; and the third middle frame and the first middle frame are disposed slidably; the second rack is fixedly disposed on the third middle frame and engaged with the first gear; the flexible panel is further disposed on the third support body.

* * * * *